(12) United States Patent
Cheng

(10) Patent No.: US 6,634,798 B2
(45) Date of Patent: Oct. 21, 2003

(54) ILLUMINATING DUST PROOF CAP FOR AN OPTICAL FIBER SOCKET

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 114 days.

(21) Appl. No.: 09/994,160

(22) Filed: Nov. 26, 2001

(65) Prior Publication Data

US 2003/0099442 A1 May 29, 2003

(51) Int. Cl.⁷ .............................. G02B 6/36; G02B 6/44
(52) U.S. Cl. ......................... 385/76; 385/77; 385/139
(58) Field of Search ............................ 385/55, 70, 76, 385/77, 134, 139

(56) References Cited

U.S. PATENT DOCUMENTS 6,227,717 B1 * 5/2001 Ott et al. ...................... 385/53
6,554,485 B1 * 4/2003 Beatty et al. ................. 385/72

* cited by examiner

*Primary Examiner*—Hemang Sanghavi
*Assistant Examiner*—Omar Rojas
(74) *Attorney, Agent, or Firm*—Pearne & Gordon LLP

(57) ABSTRACT

A dust proof cap includes a holding portion, a flange integrally formed with the holding portion by means of a first neck, an engaging portion integrally formed with the flange by way of a second neck and a plug extending out from a center of the engaging portion to correspond to the through hole of the socket. An indent with a multifaceted inner face is defined in a free end face of the holding portion so that a light is observed from a side of the dust proof cap.

6 Claims, 4 Drawing Sheets

ILLUMINATING DUST PROOF CAP FOR AN OPTICAL FIBER SOCKET

BACKGROUND OF THE INVENTION

1. Field of the Invention

The present invention relates to a dust proof cap, and more particularly to an illuminating dust proof cap for an optical fiber socket. The cap has a conical indent defined in an end face of a holding portion. An inner face of the indent is configured to be multifaceted so that the light from the filament of the optical fiber socket is able to be observed obliquely to the end face of the cap.

2. Description of Related Art

A conventional optical fiber socket (8) together with a dust proof cap (7) normally used in Hi-end signal transmission is shown in FIG. 4. The optical fiber socket (8) has a blind hole (81) and a through hole (82) defined in a bottom face defining the blind hole (81). The conventional dust proof cap (7) has a holding portion (71), a flange (72) integrally formed with the holding portion (71) by means of a first neck (73), an engaging portion (74) integrally formed with the flange (72) and a plug (76) extending out from a center of the engaging portion (74) to correspond to the through hole (82) of the socket (8). When the optical fiber socket (8) is in use, an optical fiber filament (not shown) is received in the through hole (82) of the optical fiber socket (8) to transmit a signal. When the optical fiber socket (8) is not in use, the dust proof cap (7) for the optical fiber socket (8) is inserted into the optical fiber socket (8) to have the engaging portion (74) detachably clamped by the optical fiber socket (8) and the plug (76) received in the through hole (82) to prevent the optical fiber filament from contamination. After the dust proof cap (7) is inserted into the optical fiber socket (8), the device, such as a DVD player, VCD player, etc., normally is placed against a wall with the side having the optical fiber socket (8) and the dust proof cap (7) facing the wall. If the user later tries to work with a specific signal transmission line, the user has to move away the device from the wall and stand directly behind the optical fiber socket (8) so as to scan through all the dust proof caps (7) for the correct one. Because the optical fiber filament in use emits light and light travels in a linear direction, the user has to stand directly behind the dust proof cap that covers the optical fiber socket (8) in order to spot the light emitted from the optical fiber filament. That is, the user will go through a series of search and identification processes before finding the correct optical fiber socket (8) to work with, which is too time consuming and frustrating.

To overcome the shortcomings, the present invention tends to provide an improved dust proof cap for the optical fiber socket to mitigate and obviate the aforementioned problems.

SUMMARY OF THE INVENTION

The primary objective of the present invention is to provide a dust proof cap having a conical indent defined in a free end face of the holding portion so that the light emitted from the optical fiber filament is able to be observed from a side of the dust proof cap and thus the correct signal line can be found quickly.

In order to achieve the foregoing objective, the dust proof cap for an optical fiber socket has a holding portion, a flange integrally formed with the holding portion by means of a first neck, an engaging portion integrally formed with the flange by way of a second neck and a plug extending out from a center of the engaging portion to correspond to the through hole of the socket. Further, a conical indent is defined in a free end face of the holding portion to allow the user to observe obliquely the light emitted from the end face of the dust proof cap.

Other objects, advantages and novel features of the invention will become more apparent from the following detailed description when taken in conjunction with the accompanying drawings.

DETAILED DESCRIPTION OF THE PREFERRED EMBODIMENT

Figure 1:
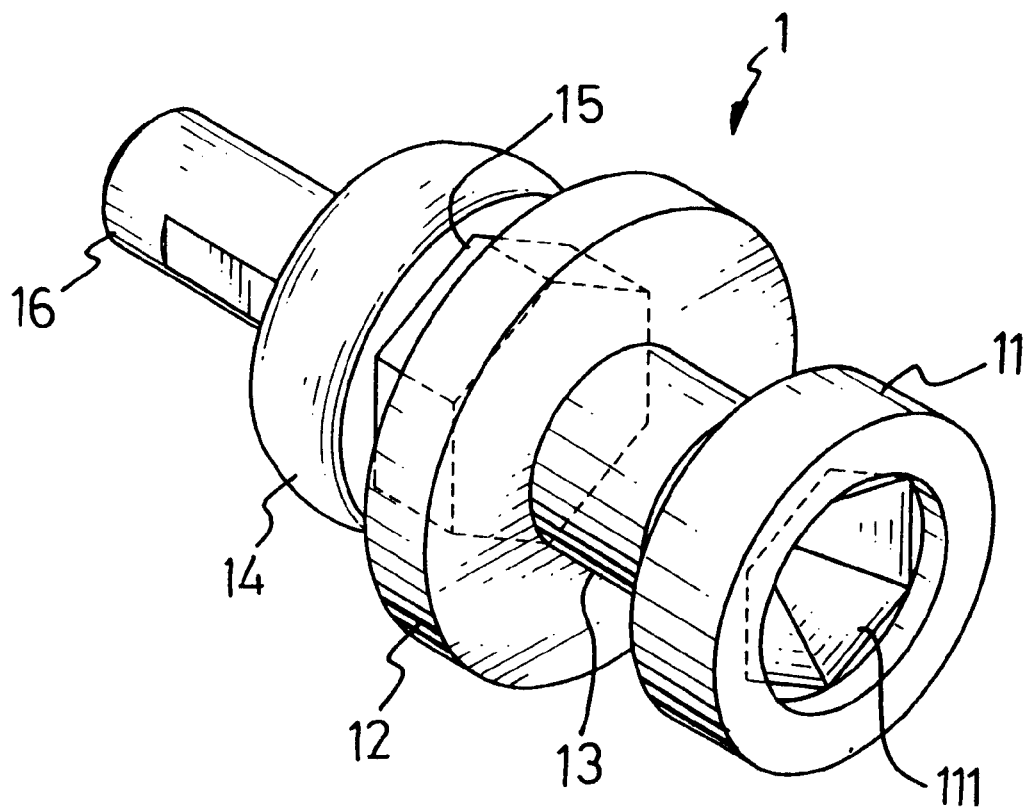
FIG. 1 is a perspective view of the dust proof cap of the present invention.
Figure 3:
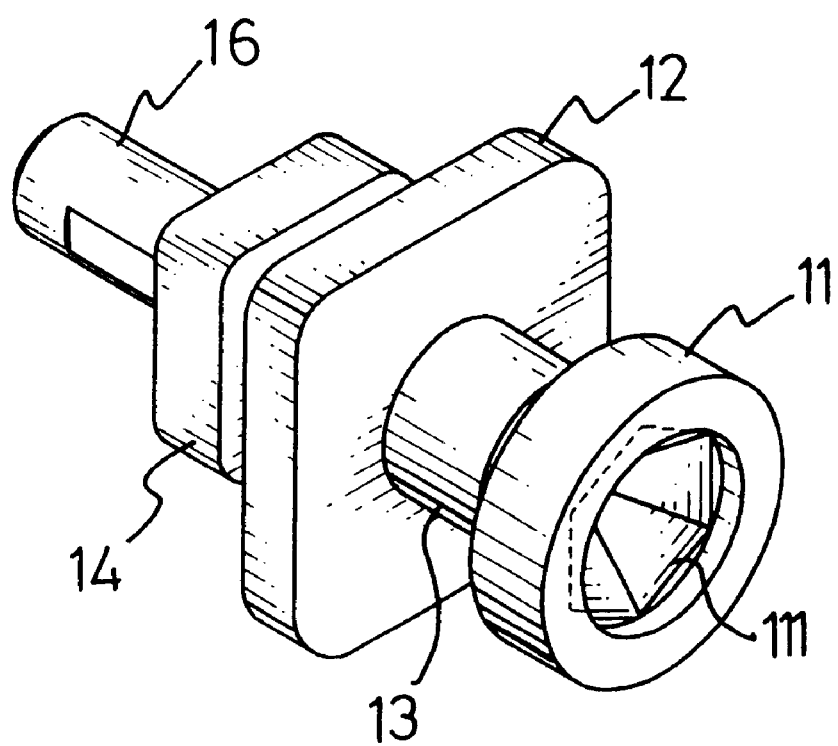
FIG. 3 is a perspective view of still another embodiment of the present invention.
Figure 4:
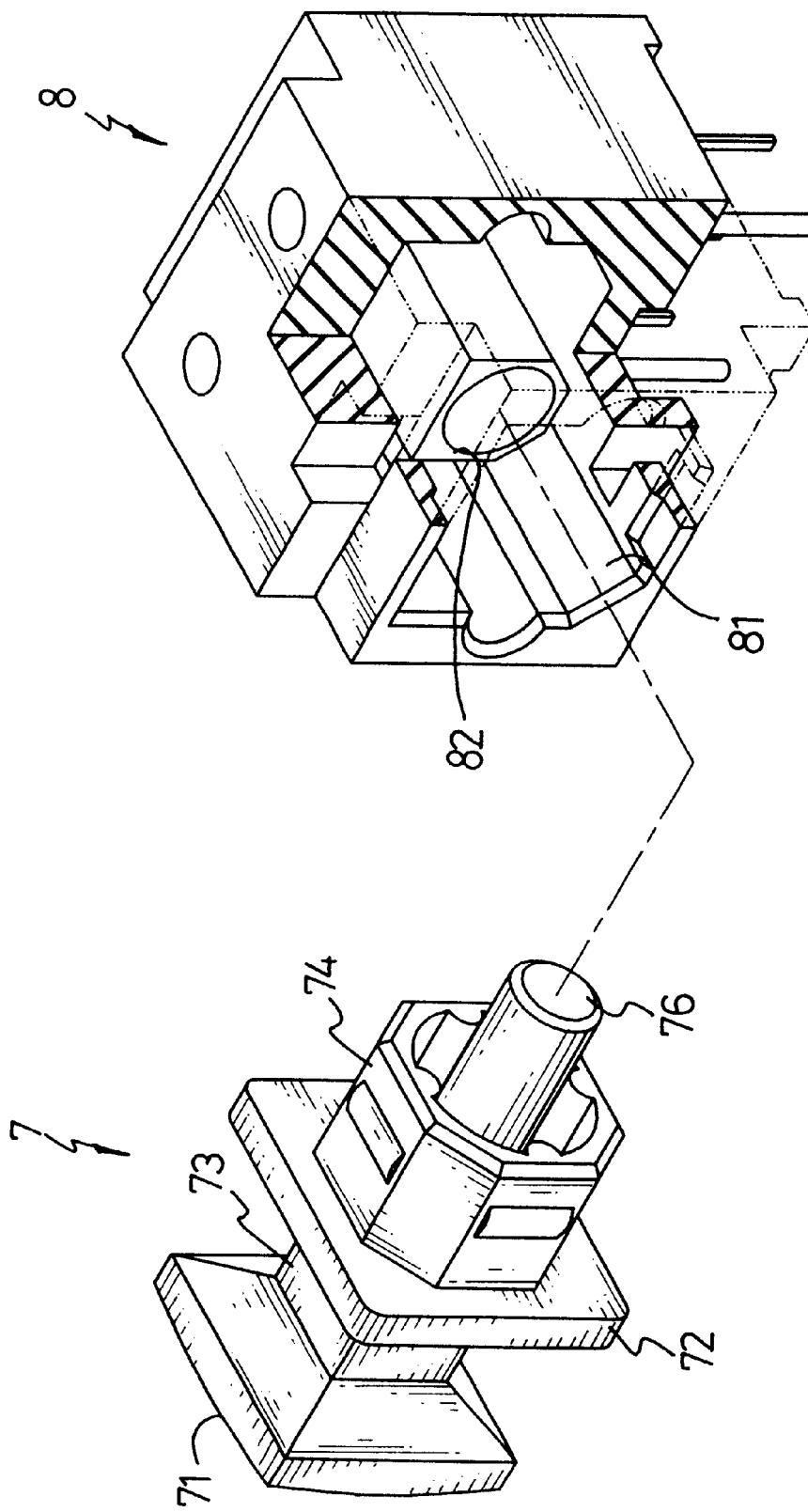
FIG. 4 is a perspective view of a prior art optical fiber socket.

With reference to FIG. 1 and taking FIG. 3 for reference, the dust proof cap (1) in accordance with the present invention has a holding portion (11), a flange (12) integrally formed with the holding portion (11) by means of a first neck (13), an engaging portion (14) integrally formed with the flange (12) by way of a second neck (15) and a plug (16) extending out from a center of the engaging portion (14) to correspond to the through hole (82) of the socket (8).

Figure 2:
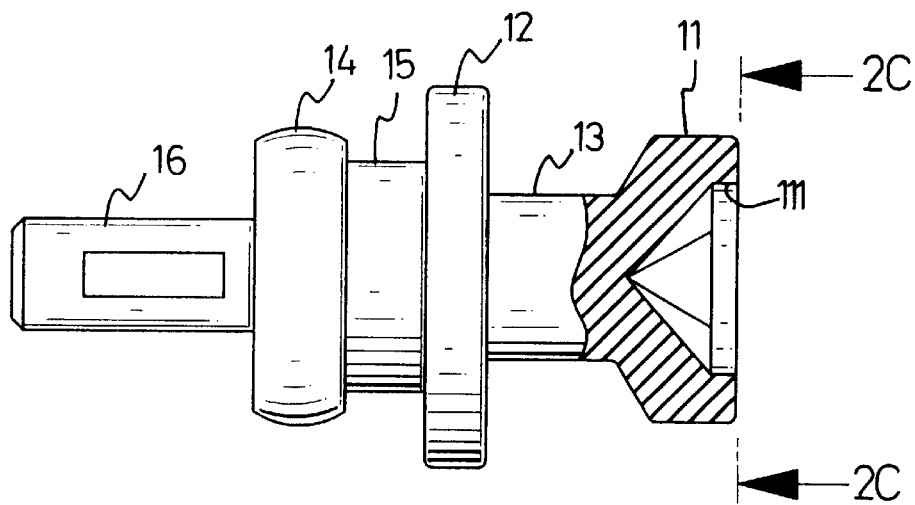
FIG. 2 is a side plan view of the dust proof cap in FIG. 1, wherein the holding portion is in partial section to show the internal structure of the holding portion.
Figure 2D:
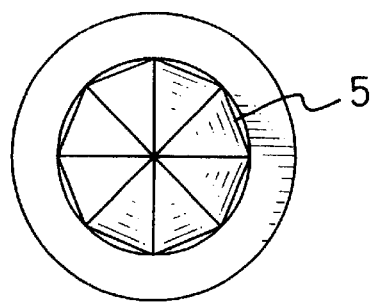
FIGS. 2A to 2D are top plan views showing embodiments of the present invention.
Figure 2A:
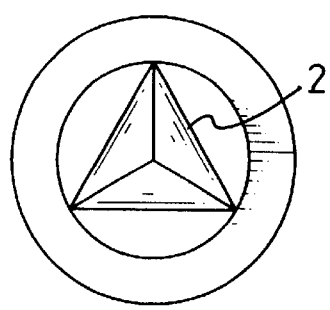
Figure 2C:
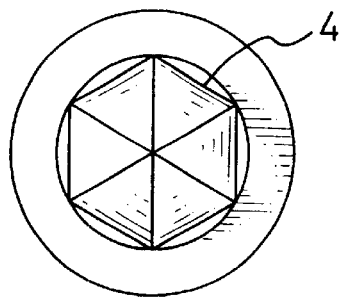
Figure 2B:
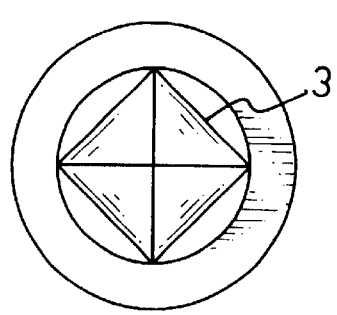

Moreover, in a free end face of the holding portion (11), a conical indent (111) is defined and an inner face of the indent (111) is formed as a plurality of regular facets, as shown in FIG. 2.

With reference to FIGS. 2A to 2D, the configuration of the inner face of the indent (111) may be three facets (2), four facets (3), five facets, six facets (4) or eight facets (5). That is, so long as the configuration of the inner face of the indent (111) is polygonal, the user is able to observe the light from the optical fiber filament from a side of the dust proof cap (1), the periphery of the holding portion (11). Therefore, the user is able to save a lot of time searching for the specific signal line by not having to stand directly behind the dust proof cap that has no indent defined therein.

With reference to FIG. 1 again, the second neck (15) also has a multifaceted configuration so as that the reflection effect might be enhanced.

With reference to FIG. 3, it is noted that the flange (12) may be configured to another shape, e.g., rectangle, so as to distinguish from the shape used in FIG. 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dust proof cap for an optical fiber socket, the dust proof cap having a holding portion, a flange integrally formed with the holding portion by means of a first neck, an engaging portion integrally formed with the flange by way of a second neck and a plug extending out from a center of the engaging portion to correspond to a through hole of the optical fiber socket, wherein the improvement comprises:

a conical indent defined in a free end face of the holding portion so that light from a filament received in the optical fiber socket is able to be observed from a side of the dust proof cap.

2. The dust proof cap as claimed in claim 1, wherein the conical indent has three facets.

3. The dust proof cap as claimed in claim 2, wherein conical indent has four facets.

4. The dust proof cap as claimed in claim 2, wherein conical indent has five facets.

5. The dust proof cap as claimed in claim 2, wherein conical indent has six facets.

6. The dust proof cap as claimed in claim 2, wherein conical indent has eight facets.

* * * * *